(12) United States Patent
Kumar Rao

(10) Patent No.: US 9,569,300 B2
(45) Date of Patent: Feb. 14, 2017

(54) SYSTEMS AND METHODS FOR ERROR HANDLING

(71) Applicant: Wipro Limited, Bangalore (IN)

(72) Inventor: Arjun Kumar Rao, Bangalore (IN)

(73) Assignee: Wipro Limited, Bangalore (IN)

(*) Notice: Subject to any disclaimer, the term of this patent is extended or adjusted under 35 U.S.C. 154(b) by 119 days.

(21) Appl. No.: 14/741,524

(22) Filed: Jun. 17, 2015

(65) Prior Publication Data

US 2016/0246667 A1    Aug. 25, 2016

(30) Foreign Application Priority Data

Feb. 24, 2015 (IN) .............................. 883/CHE/2015

(51) Int. Cl.
*G06F 11/00* (2006.01)
*G06F 11/07* (2006.01)
*G06Q 10/00* (2012.01)

(52) U.S. Cl.
CPC ....... *G06F 11/0793* (2013.01); *G06F 11/0715* (2013.01); *G06Q 10/00* (2013.01)

(58) Field of Classification Search
CPC ... G06F 11/0715; G06F 11/0793; G06Q 10/00
See application file for complete search history.

(56) References Cited

U.S. PATENT DOCUMENTS

| 2002/0103900 | A1* | 8/2002 | Cornelius | G06F 11/0715 709/224 |
| 2005/0066241 | A1* | 3/2005 | Gross | G05B 23/0283 714/48 |
| 2005/0262472 | A1* | 11/2005 | Wood | H04L 41/064 717/102 |
| 2008/0154409 | A1* | 6/2008 | Srikumar | G05B 19/4183 700/95 |
| 2008/0195576 | A1* | 8/2008 | Sande | G06F 17/30566 |
| 2010/0125541 | A1* | 5/2010 | Wendel | G06F 9/4443 706/47 |
| 2012/0096320 | A1* | 4/2012 | Caffrey | G06F 11/0709 714/57 |
| 2014/0214801 | A1* | 7/2014 | Ciliberti, III | G06Q 10/0631 707/722 |
| 2014/0310564 | A1* | 10/2014 | Mallige | G06F 11/0781 714/47.1 |
| 2014/0380105 | A1* | 12/2014 | Michel | G06F 11/0769 714/57 |

(Continued)

*Primary Examiner* — Joshua P Lottich
(74) *Attorney, Agent, or Firm* — LeClairRyan, a Professional Corporation

(57) ABSTRACT

Systems and methods for performing error handling in ERP systems are disclosed. In one implementation, the method comprises receiving processed jobs data from at least one of the ERP systems. Further, the method comprises analyzing the processed jobs data to determine error data associated with one or more errors occurred while processing jobs in the at least one of the ERP systems. Further, the method comprises executing at least one corrective action to rectify the one or more errors based on the error data. Further, the method comprises tracking processing of the jobs in the at least one of the ERP system upon executing the at least one corrective action. Further, the method comprises performing one or more trigger actions to improve performance of the jobs based on the tracking.

18 Claims, 3 Drawing Sheets

(56) References Cited

U.S. PATENT DOCUMENTS

| | | | |
|---|---|---|---|
| 2015/0046412 A1* | 2/2015 | Arthanat | G06F 17/30557 707/694 |
| 2015/0089304 A1* | 3/2015 | Jeong | G06F 11/0766 714/48 |
| 2016/0170821 A1* | 6/2016 | Shiralkar | G06F 11/0751 714/37 |

* cited by examiner

SYSTEMS AND METHODS FOR ERROR HANDLING

This application claims the benefit of Indian Patent Application No. 883/CHE/2015 filed Feb. 24, 2015, which is hereby incorporated by reference in its entirety.

TECHNICAL FIELD

The present subject matter relates to error handling systems, and, particularly but not exclusively, to systems and methods for error handling in Enterprise Resource Planning (ERP) systems.

BACKGROUND

Generally, ERP systems are used to organize, define and standardize business processes in an organization by effectively managing and interpreting data from various business activities. In an example, the business activities may include planning of resources, manufacturing or service delivery, inventory management, supply chain management (SCM), marketing and sales, and shipping and payment.

In a SCM based ERP systems, background jobs and processes are considered for carrying out critical supply chain planning and forecasting activities. Typically, when the background jobs and the processes are executed by an ERP system, there are constant background failures of these batch jobs or process chains. In an example, critical batch processing jobs that carry forward business activities in the background usually fail due to Inconsistency between systems or due to missing data that is required by the job for processing the activity or any other manual error during customization. This causes critical information availability failure for ERP system end users. To rectify and monitor the background failures, manual interventions are needed. Further, stipulated manual corrections are also needed to avoid any data miss-match or wrong planning from being carried out and presented to the business users.

SUMMARY

Disclosed herein are systems and methods for performing error handling in Enterprise Resource Planning (ERP) systems. In one example, the system comprises a processor, a memory communicatively coupled to the processor, wherein the memory stores processor-executable instructions, which, on execution, cause the processor to receive processed jobs data from at least one of the ERP systems. The processor-executable instructions, on execution, further cause the processor to analyze the processed jobs data to determine error data associated with one or more errors occurred while processing jobs in the at least one of the ERP systems. The processor-executable instructions, on execution, further cause the processor to execute at least one corrective action to rectify the one or more errors based on the error data. The processor-executable instructions, on execution, further cause the processor to track processing of the jobs in the at least one of the ERP system upon executing the at least one corrective action. The processor-executable instructions, on execution, further cause the processor to perform one or more trigger actions to improve performance of the jobs based on the tracking.

Certain embodiments of the present disclosure relates to a method for performing error handling in ERP systems comprises receiving processed jobs data from at least one of the ERP systems. Further, the method comprises analyzing the processed jobs data to determine error data associated with one or more errors occurred while processing jobs in the at least one of the ERP systems. Further, the method comprises executing at least one corrective action to rectify the one or more errors based on the error data. Further, the method comprises tracking processing of the jobs in the at least one of the ERP system upon executing the at least one corrective action. Further, the method comprises performing one or more trigger actions to improve performance of the jobs based on the tracking.

Certain embodiments of the present disclosure also relate to a non-transitory, computer-readable medium storing instructions for performing error handling in ERP systems that, when executed by a processor, cause the processor to perform operations comprising receiving processed jobs data from at least one of the ERP systems. Further, the operations comprise analyzing the processed jobs data to determine error data associated with one or more errors occurred while processing jobs in the at least one of the ERP systems. Further, the operations comprise executing at least one corrective action to rectify the one or more errors based on the error data. Further, the operations comprise tracking processing of the jobs in the at least one of the ERP system upon executing the at least one corrective action. Further, the operations comprise performing one or more trigger actions to improve performance of the jobs based on the tracking.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising,"

"having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present subject matter discloses systems and methods for performing error handling in ERP systems. The systems and methods may be implemented in a variety of computing systems. The computing systems that can implement the described method(s) include, but are not limited to a server, a desktop personal computer, a notebook or a portable computer, and a mainframe computer. Although the description herein is with reference to certain computing systems, the systems and methods may be implemented in other computing systems, albeit with a few variations, as will be understood by a person skilled in the art.

Embodiments of the present disclosure are related to a method and an error handling system for handling errors that arise during execution of background jobs and processes in ERP systems. In one implementation, the error handling system may receive processed jobs data from the ERP systems. The processed jobs data comprises data obtained by execution of background jobs and processed in the ERP systems. The processed jobs data may also include parameters specified by ERP system and business users. Further, the error handling device may analyze the processed jobs data to determine error data associated with one or more errors occurred during execution of the background jobs. Thereafter, the error handling system may analyze the error data based on predictive analytics and apply man-machine algorithms to the error data to determine at least one corrective action to rectify the one or more errors. Once the at least one corrective action is performed, the error handling system monitors processing of the jobs. Further, the error handling system may trigger one or more trigger actions to improve performance of the jobs and generate an error handling report for the business users. In an example, the error handling report may include error data, ERP data, and correction data.

Figure 1:
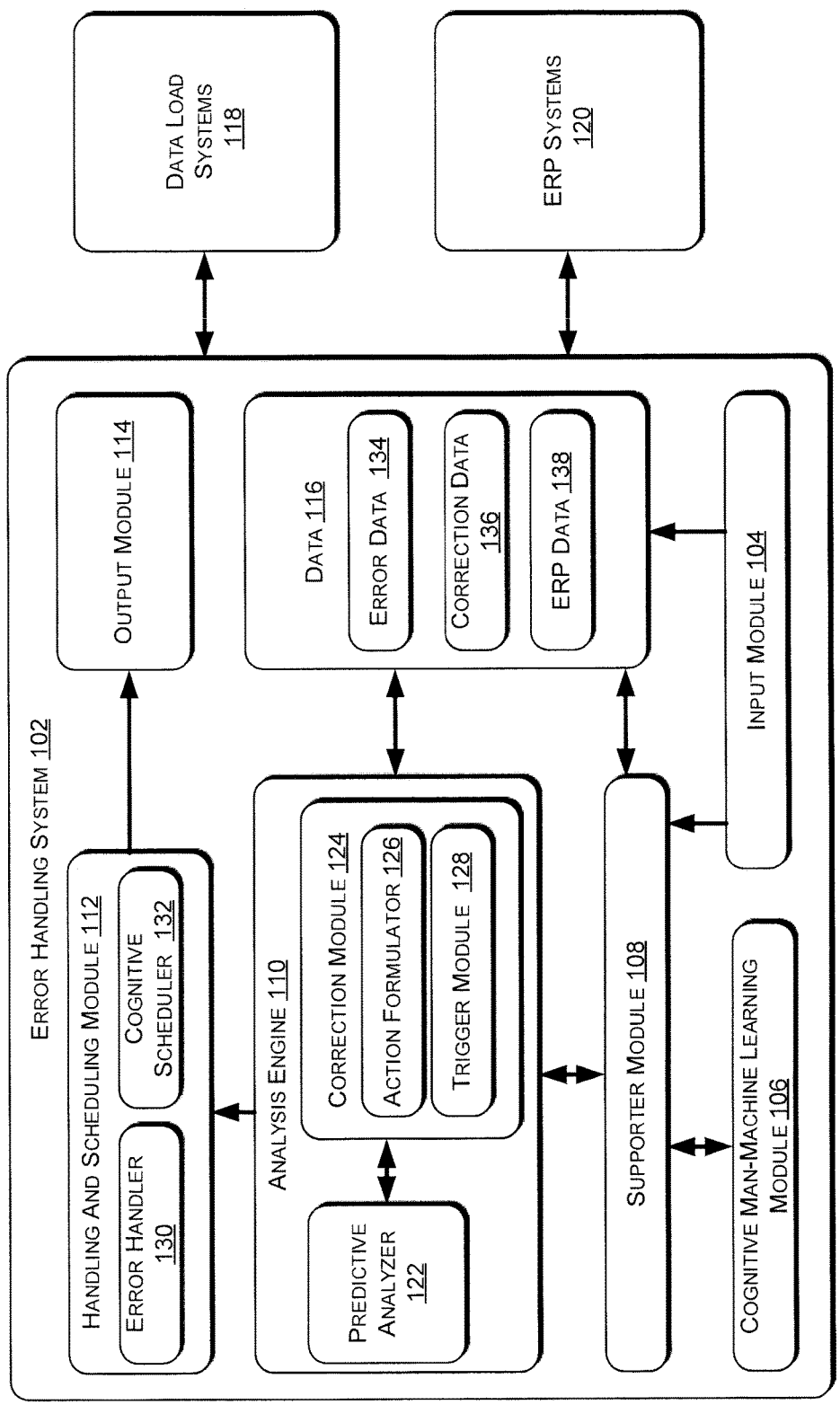
FIG. 1 illustrates a block diagram of a high-level architecture of an exemplary error handling system, in accordance with some embodiments of the present disclosure.
Figure 2:
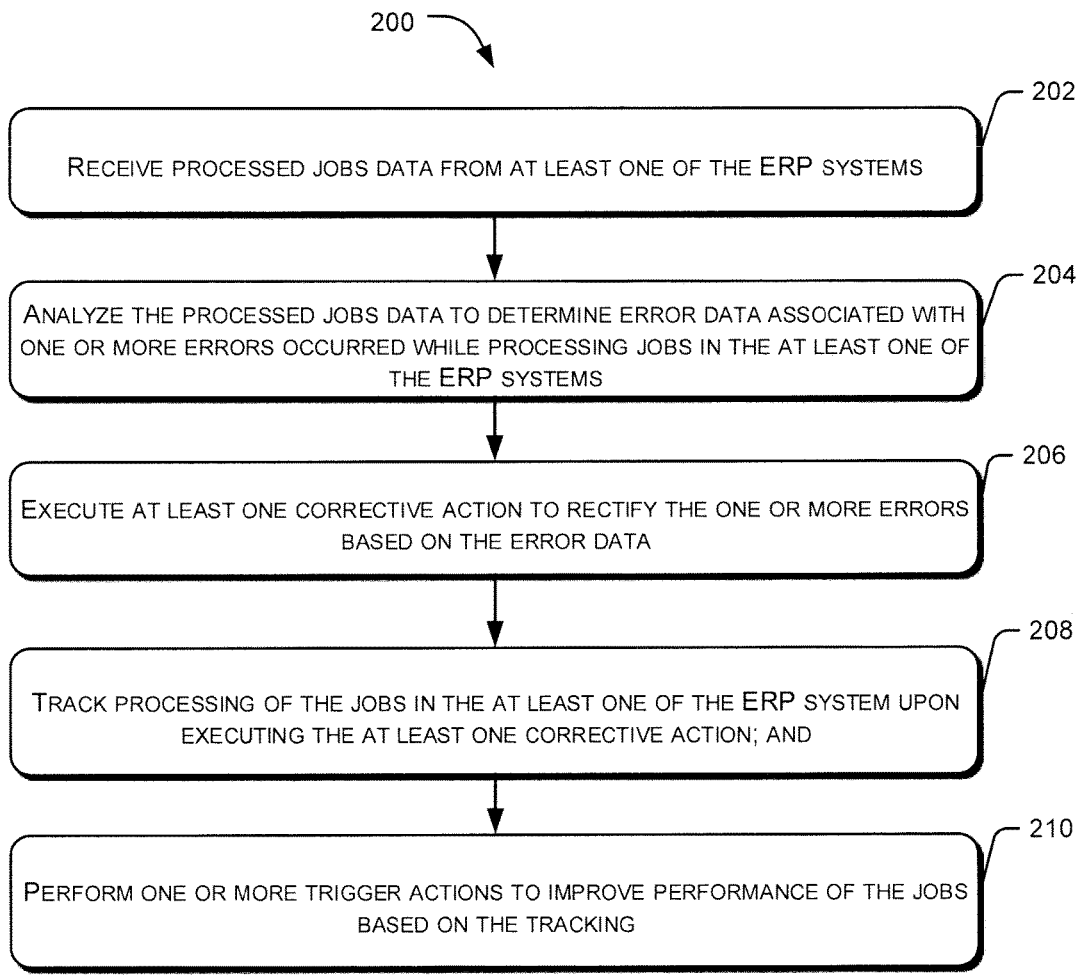
FIG. 2 illustrate an exemplary computer implemented method for performing error handling in ERP systems, in accordance with some embodiments of the present disclosure.
Figure 3:
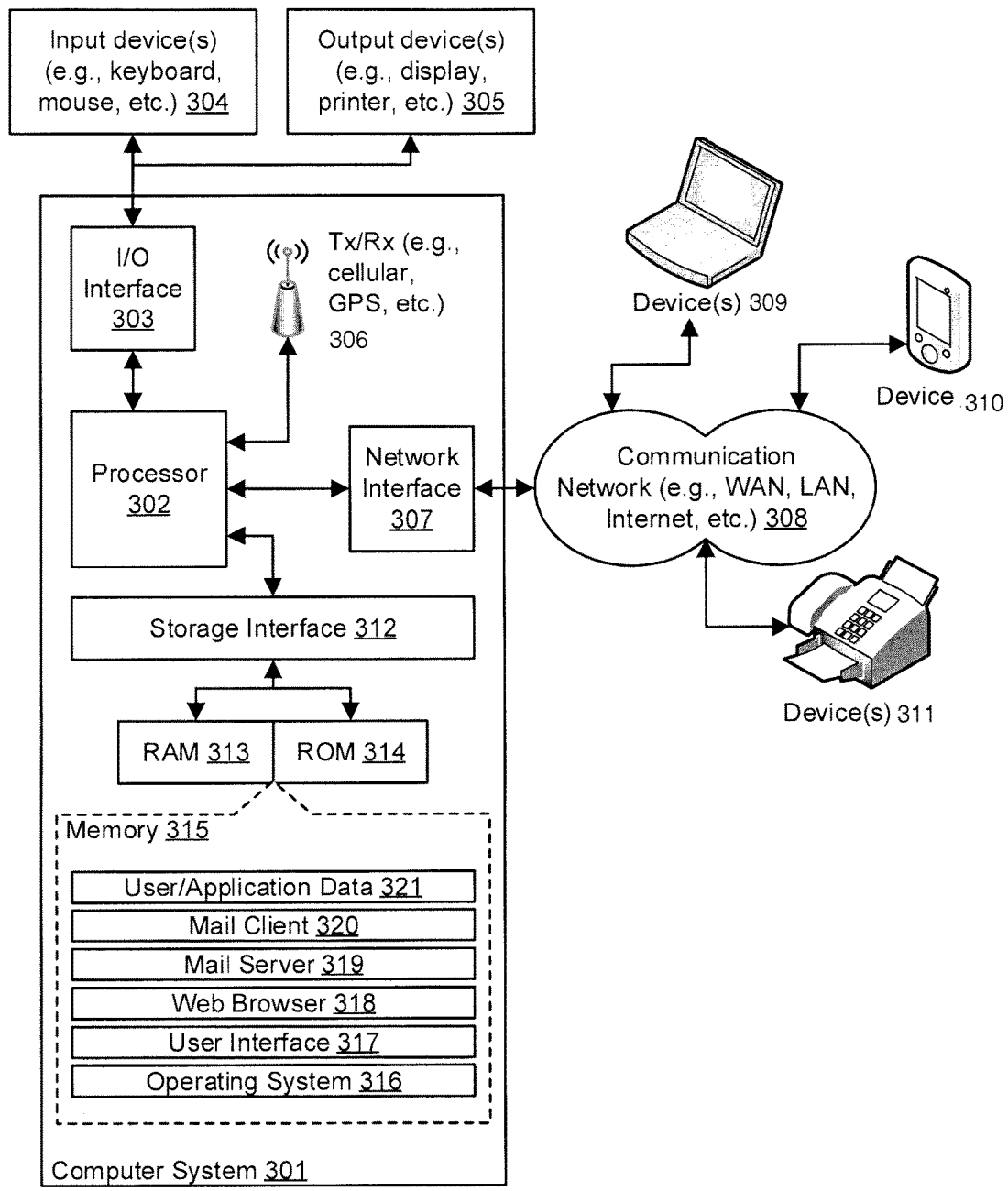
FIG. 3 is a block diagram of an exemplary computer system for implementing embodiments consistent with the present disclosure.

Working of the systems and methods for performing error handling in ERP systems is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates a block diagram of a high-level architecture of an exemplary error handling system 102 or error handling computing device, in accordance with some embodiments of the present disclosure. The error handling system 102, hereinafter may be interchangeably referred to as a system 102, comprises an input module 104, a cognitive man-machine learning module 106, a supporter module 108, an analysis engine 110, a handling and scheduling module 112, an output module 114, and data 116.

Further, as shown in FIG. 1, the system 102 is communicatively coupled to data load systems 118 and ERP systems 120. In an example, the ERP systems 120 may be supply chain management (SCM) based conceptual ERP systems provided by a third party. The ERP systems 120 may comprise complete set of SCM backgrounds process chains and jobs. The ERP systems 120 execute these process chains and jobs and provide execution to the input module 104.

In an example, the data load systems 118 may be third party systems used for data warehousing and reporting purpose. Also, the data load systems 118 receive inputs, from business users, indicating customization changes to the process flows or jobs. In an example, the business user may be an administrator of the system 102 or the ERP systems 120, or stakeholders, such as project managers, team leads in an organization where the ERP systems 120 are implemented.

Further, as shown in FIG. 1, the analysis engine 110 comprises sub-modules: a predictive analyzer 122 and a correction module 124. The correction module 124 further comprises an action formulator 126 and a trigger module 128. Also, the handling and scheduling module 112 comprises an error handler 130 and a cognitive scheduler 132.

Further, the data 116 comprises data and reports generated by various modules of the system 102 during error handling process. As shown in FIG. 1, the data 116 comprises error data 134, correction data 136, and ERP data 138. In an example, the error data 134 may comprise information pertaining to errors that occurred in the ERP systems 120 while processing of jobs. The correction data 136 may comprise details pertaining to corrective actions taken by the system 102 on different errors. The ERP data 138 may comprise details pertaining to background process and jobs and customization that the jobs are intended to perform. In an example, the ERP data 138 may also include a remote function call (RFC) with user parameters.

In operations, for error handling in the ERP systems 120, the input module 104 may receive processed jobs data from the ERP systems 120. The processed jobs data may comprise data related to the jobs executed by the ERP systems 120 and additional details, such as the user parameters and ERP parameters. The user parameters may be specified by a user for functioning of the background job or process chain. The ERP parameters may be used for categorization of error and identifying timeframe for error maintenance. In an example, the ERP parameters are provided by the input module 104 to the analysis engine 110 to communicate when to start the error handling/correcting process.

The cognitive man-machine learning module 106 may monitor and learn actions performed by the business user in the ERP systems 120 when the errors were occurred previously. In one implementation, based on the monitoring and the learning, the cognitive man-machine learning module 106 may develop man-machine algorithms to rectify the errors. Also, the cognitive man-machine learning module 106 may be initialized with details of artificial intelligence to report which job has been triggered currently in the background in the ERP system, so that the analysis engine 110 knows when to start its functionality.

The supporter module 108 act as an interface that leverages inputs from the cognitive man-machine algorithm and the input module 104 to the analysis engine 110.

The cognitive man-machine learning module 106 and the analysis module have inbuilt Artificial Intelligence (AI) program incorporated into it. The artificial intelligence program allows the cognitive man-machine learning module 106 and the analysis module to correct error based on what is read from user interactions with the ERP systems 120.

The analysis engine 110 is a collaborative man-machine cognitive system and predictive analyzer 122. The analysis engine 110 receives the processed jobs data and analyzes it to determine one or more errors that occurred during execution of the background jobs. Also, the analysis engine 110 applies the man-machine algorithms to the processed jobs data and recommends actions to be performed for rectifying the one or more errors identified by predictive analysis. In an example, the predictive analyzer 122 tracks error by analyzing the processed jobs data and obtains the error data 134. The error data 134 may include errors occurred during execution of the jobs, cause of the errors, failed jobs, and past history of the failed jobs with time stamps. Further, the predictive analyzer 122 determines whether to initiate the analysis or error handling based on the one or more errors identified in the error data 134.

Thereafter, the correction module 124 determines at least one corrective action for to rectify the one or more errors. In an example, the correction module 124 works based on the learning received from the cognitive man-machine learning module 106. The correction module 124 may then execute the at least one corrective action based on the man-machine learning algorithms. Further, the correction module 124 may monitor processing of the background jobs upon executing the at least one corrective action and determine one or more triggers that needs to be done based on the monitoring to avoid the one or more errors from re-occurring.

In an example, the action formulator 126 is responsible for determining the at least one corrective action that that needs to be taken on the one or more errors received and the analysis performed by the Predictive analyzer 122.

In an example, the trigger module 128 determines the one or more trigger actions to be taken for the better performance of the job. The trigger module 128 may perform the one or more trigger action by continuously monitoring the processing of the background jobs once the at least one corrective action is performed. In this manner, the correction engine ensures that the one or more errors do not occur.

Further, the handling and scheduling module 112 is an after care module that is used for corrective measures that may be needed if the at least one corrective action taken by the correction module 124 has caused a change to the actual performance of the job.

In the handling and scheduling module 112, the error handler 130 may monitor effects on processes in the ERP systems 120 due to execution of the at least one corrective action.

Further, the cognitive scheduler 132 may determine whether to re-trigger the steps or jobs that have failed or to trigger a next step. In an example, the cognitive scheduler 132 may re-trigger the processes that failed in the ERP systems 120 based on the monitoring of the processes.

Subsequently, the output module 114 indicates to the business user that the one or more errors have rectified and all the processes are running smoothly. In an example, the output module 114 may generate an error handling report. The error handling report may comprise the error data 134, the correction data 136, and the ERP data 138. The output module 114 may also store the data generated by the various modules or engine of the system 102 in the data 116.

In one implementation, where background jobs are being executed in a SCM based ERP system, the input module 104 may receive the processed jobs data generated by execution of the background jobs. For example, say, the processed jobs data have information that a couple of background jobs failed such as, some characteristic value combinations (CVCs) cannot be processed in block 40, time bucket does not exist, and communication failure. In case where the CVCs cannot be processed, a consistency check may be run in the background for the planning area and or the live cache consistency check in case of an SAP environment. In case where the time bucket does not exist, a step green may be performed via the inbuilt function module program by providing the various parameters that the particular failed job has customized in it for processing data. In case of a communication error, the job needs to be processed after the data load process is completed or after a stipulated amount of time this job can be repeated. The cognitive man-machine learning module 106 may read the system failure and then it learns the respective corrective action that needs to be performed during such a failure. During learning, the cognitive man-machine learning module 106 also reads how the job is performing after the manual correction is done. Thereafter, for every job failure the cognitive man-machine learning module 106 tends to read the error and finds possible solution that the user has performed. The predictive analyzer 122 analyses these errors and the different conditions that the job has to actually perform and this then generates a complete analysis for the correction module 124 that combines the learners reading and analyzers complete detailed analysis and consequently formulates the at least one corrective action. In this manner, the system 102 efficiently performs error handling during background processing of jobs in the ERP systems 120.

Thus, the system 102 of present subject matter performs error handling of background jobs in ERP systems 120. The system 102 rectifies the errors occurred during execution of the background jobs by employing collaborative functioning of man-machine concept and predictive analysis. The system 102 improves ERP system functionality by efficiently handling the errors and preventing regular failure of background processes. Further, the system 102 ensures all the processes are working fine upon corrective actions and checks whether any customization change is needed for improved functioning of planning processes.

FIG. 2 illustrate an exemplary computer implemented method for performing error handling in ERP systems 120, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to method 200 as depicted in FIG. 2, as shown in block 202, processed jobs data is received from at least one of the ERP systems 120. In an example, where the background jobs are getting executed in the ERP systems 120, it may be possible that one or more jobs may get failed or there may be some error in the execution. The processed jobs data may comprise this information pertaining to the execution of the background jobs.

The system 102 may receive the processed jobs data to rectify the errors that occurred during execution of the background jobs. In an example, the ERP parameters and the user parameters may be obtained by the input module 104 from the data load systems 118 and the ERP systems 120. Further, the cognitive man-machine learning module 106 may learn user inputs and customizations through ERP intelligence. Further, the system 102 may keep on monitoring the ERP systems 120 and updating information obtained from the user inputs and interaction with the ERP systems 120.

At block 204, the processed jobs data are analyzed to determine error data 134 associated with one or more errors occurred while processing jobs in the at least one of the ERP systems 120. The error data 134 may comprise errors occurred during execution of the jobs, cause of the errors, failed jobs, and past history of failed jobs with time stamps.

The analysis engine 110 may then further analyze the one or more errors by checking error message received as the input. The analysis engine 110 may also analyze the error generated with previously dealt errors that it had analyzed and check whether the other steps of the process or jobs have any faulty influence from the error that's occurred.

Further, the analysis engine 110 keeps track of whether to start the analyzing of failure or probable failure depending on the jobs previous performance. In an example, if a job has failed at least once before in the previous run, i.e., in one month, then the analysis engine 110 may start immediately start analysis as the job starts without waiting for failure. Also, the analysis engine 110 may monitor the jobs and check if any preventive action is required.

At block 206, at least one corrective action is performed to rectify the one or more errors based on the error data 134. The predictive analyzer 122 analyzes the error data 134 and identifies the one or more errors occurred in the ERP systems 120. Thereafter, the correction module 124 may determine the at least one corrective action to rectify the one or more errors based on the man-machine algorithms.

In one example, the correction module 124 and the predictive analyzer 122 check for further action that can be formulated for the next run so that if the analysis engine 110 starts from the start of the job, for example, in case the job has failed in the last few days/weeks as maintained, the action formulator 126 may form corrective action based on previous error so that the error does not reoccur. The action formed is such that it tries to prevent any error from re-occurring. The action formulator 126 also formulates if there is any simultaneous consistency run for the system 102 that is required to be triggered in parallel, along with the start of the job, so that the job does not fail during its next trigger due to any system or data inconsistency. This is a preventive action formulated based on the system 102 and data check done by the predictive analyzer 122 during the course of analyzing the failure when this job is re-triggered during the next run.

At block 208, processing of the jobs is tracked in the at least one of the ERP system upon executing the at least one corrective action. In an example, the trigger module 128 may monitor the processing of the jobs after execution of the one or more corrective actions to see whether the at least one action have not changed the nature of the jobs or to see whether the jobs are functioning in an expected manner.

At block 210, one or more trigger actions are determined to improve performance of the jobs based on the tracking. In an example, the trigger module 128 may initiate the one or more trigger actions to improve the performance of the background jobs based on the tracking.

Further, the handling and scheduling module 112 may monitor effects on processes in the ERP systems 120 due to execution of the at least one corrective action. Thereafter, the handling and scheduling module 112 may re-trigger the processes that failed in the at least one of the ERP systems 120. The handling and scheduling module 112 ensures that the error correction process has not changed any basic functionality of the job and its customization is in line with its actual process. The changes that require any kind of new customization for the functionality of the job may be reported and uploaded to the data load systems 118 that feed the data to the concerned planning team. Subsequently, the handling and scheduling module 112 may trigger jobs either from the failed jobs or a next job based on the corrective action taken. In this manner, a new run is sent to the output module 114 thereby automating the entire process.

Further, an error handling report is generated by the output module 114 for the business users. The error handling report may comprise the error data 134, the correction data 136, and the ERP data 138. The error data 134 may comprise details of the errors that occurred in the ERP systems 120 while processing of jobs. The correction data 136 may comprise details of corrective actions taken by the system 102 to rectify different errors. The ERP data 138 may comprise details pertaining to background process and jobs and customization that the jobs are intended to perform.

Computer System

FIG. 3 is a block diagram of an exemplary computer system for implementing embodiments consistent with the present disclosure. Variations of computer system 301 may be used for implementing the input module 104, the cognitive man-machine learning module 106, the supporter module 108, the analysis engine 110, and the handling and scheduling module 112 or any of the devices presented in this disclosure. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for performing error handling in ERP systems 120. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of error management, the method comprising:
   receiving, by an error handling computing device, processed jobs data from at least one Enterprise Resource Planning (ERP) system;
   analyzing, by the error handling computing device, the processed jobs data to determine error data associated with one or more errors occurred while processing one or more jobs in the ERP system;
   executing, by the error handling computing device, at least one corrective action to rectify the errors based on the error data;
   tracking, by the error handling computing device, processing of the jobs in the ERP system upon executing the corrective action; and
   performing, by the error handling computing device, one or more trigger actions to improve performance of one or more of the jobs based on the tracking.

2. The method as claimed in claim 1 further comprising:
   monitoring, by the error handling computing device, one or more effects on one or more processes in the ERP system due to execution of the corrective action; and
   re-triggering, by the error handling computing device, one or more of the processes that are determined to have failed in the ERP system based on the monitoring.

3. The method as claimed in claim 1, wherein the processed jobs data comprises an indication of the jobs executed by the ERP system, one or more ERP parameters, or one or more user parameters.

4. The method as claimed in claim 1, wherein the error data comprises an indication of one or more errors that occurred during execution of the jobs, at least one cause of each of the errors, one or more failed ones of the jobs, or past history of the failed ones of the jobs including one or more corresponding time stamps.

5. The method as claimed in claim 1, wherein the executing the corrective action further comprises:
   analyzing the error data based on predictive analytics; and
   determining, based on one or more machine learning algorithms, the corrective action to rectify the errors based on the analyzing.

6. The method as claimed in claim 1 further comprising generating, by the error handling computing device, an error handling report comprising the error data, correction data, or ERP data.

7. An error handling computing device, comprising at least one processor and a memory coupled to the processor which is configured to be capable of executing programmed instructions comprising and stored in the memory to:
   receive processed jobs data from at least one Enterprise Resource Planning (ERP) system;
   analyze the processed jobs data to determine error data associated with one or more errors occurred while processing one or more jobs in the ERP system;
   execute at least one corrective action to rectify the errors based on the error data;
   track processing of the jobs in the ERP system upon executing the corrective action; and
   perform one or more trigger actions to improve performance of one or more of the jobs based on the tracking.

8. The error handling computing device as claimed in claimed 7, wherein the processor coupled to the memory is further configured to be capable of executing at least one additional programmed instruction to:
   monitor one or more effects on one or more processes in the ERP system due to execution of the corrective action; and
   re-trigger one or more of the processes that are determined to have failed in the ERP system based on the monitoring.

9. The error handling computing device as claimed in claimed 7, wherein the processed jobs data comprises an indication of the jobs executed by the ERP system, one or more ERP parameters, or one or more user parameters.

10. The error handling computing device as claimed in claimed 7, wherein the error data comprises an indication of one or more errors that occurred during execution of the jobs, at least one cause of each of the errors, one or more failed ones of the jobs, or past history of the failed ones of the jobs including one or more corresponding time stamps.

11. The error handling computing device as claimed in claimed 7, wherein the processor coupled to the memory is further configured to be capable of executing at least one additional programmed instruction to:
    analyze the error data based on predictive analytics; and
    determine, based on one or more machine learning algorithms, the corrective action to rectify the errors based on the analyzing.

12. The error handling computing device as claimed in claim 7, wherein the processor coupled to the memory is further configured to be capable of executing at least one additional programmed instruction to generate an error handling report comprising the error data, correction data, or ERP data.

13. A non-transitory computer readable medium having stored thereon instructions for managing a buffer cache comprising executable code which when executed by a processor, causes the processor to perform steps comprising:
   receiving processed jobs data from at least one Enterprise Resource Planning (ERP) system;
   analyzing the processed jobs data to determine error data associated with one or more errors occurred while processing one or more jobs in the ERP system;
   executing at least one corrective action to rectify the errors based on the error data;
   tracking processing of the jobs in the ERP system upon executing the corrective action; and
   performing one or more trigger actions to improve performance of one or more of the jobs based on the tracking.

14. The non-transitory computer readable medium as claimed in claim 13, further having stored thereon at least one additional instruction comprising executable code which when executed by the processor, causes the processor to perform at least one additional step comprising:
   monitoring one or more effects on one or more processes in the ERP system due to execution of the corrective action; and
   re-triggering one or more of the processes that are determined to have failed in the ERP system based on the monitoring.

15. The non-transitory computer readable medium as claimed in claim 13, wherein the processed jobs data comprises an indication of the jobs executed by the ERP system, one or more ERP parameters, or one or more user parameters.

16. The non-transitory computer readable medium as claimed in claim 13, wherein the error data comprises an indication of one or more errors that occurred during execution of the jobs, at least one cause of each of the errors, one or more failed ones of the jobs, or past history of the failed ones of the jobs including one or more corresponding time stamps.

17. The non-transitory computer readable medium as claimed in claim 13, wherein the executing further comprises:
   analyzing the error data based on predictive analytics; and
   determining, based on one or more machine learning algorithms, the corrective action to rectify the errors based on the analyzing.

18. The non-transitory computer readable medium as claimed in claim 13, further having stored thereon at least one additional instruction comprising executable code which when executed by the processor, causes the processor to perform at least one additional step comprising generating an error handling report comprising the error data, correction data, or ERP data.

* * * * *